United States Patent [19]

Kim et al.

[11] Patent Number: 5,479,265

[45] Date of Patent: Dec. 26, 1995

[54] VIDEO DATA RECORDING APPARATUS FOR DIGITAL VIDEO CASSETTE RECORDER

[75] Inventors: Seung I. Kim; Byoung K. Yoo, both of Seoul, Rep. of Korea

[73] Assignee: Goldstar Co., Ltd., Seoul, Rep. of Korea

[21] Appl. No.: 162,619

[22] Filed: Dec. 7, 1993

[30] Foreign Application Priority Data

Dec. 12, 1992 [KR] Rep. of Korea ............... 24074/1992

[51] Int. Cl.$^6$ .................................................. H06N 5/76
[52] U.S. Cl. ......................................... 358/335; 358/312
[58] Field of Search .................................. 358/335, 310, 358/342, 312; 348/705, 706; 360/10.1, 10.3, 61, 62, 63, 64; H04N 5/76, 5/92

[56] References Cited

U.S. PATENT DOCUMENTS

| | | |
|---|---|---|
| 4,316,223 | 2/1982 | Baldwin et al. |
| 5,136,394 | 8/1992 | Haikawa et al. ............ 358/335 |
| 5,162,922 | 11/1992 | Takemura et al. ........... 358/342 |
| 5,305,105 | 4/1994 | Heo ........................ 348/485 |
| 5,339,167 | 8/1994 | Kuroda .................... 358/339 |

OTHER PUBLICATIONS

IEEE Transactions on Consumer Electronics, vol. 38, No. 3, Aug. 1992, New York, US, pp. 236–241; Lee et al., 'A Study on New DCT–Based Bit Rate Reduction Algorith and Variable Speed Playback for a Home–Use Digital VCR' p. 239, rt. col., line 14–line 36.

*Primary Examiner*—Tommy P. Chin
*Assistant Examiner*—Robert Chevalier

[57] ABSTRACT

A video data recording apparatus for a digital VCR comprising a frame controller for detecting a vertical synchronous signal from input video data and outputting a frame detect signal and a first switching signal in response to the detected vertical synchronous signal, a switching counter for generating a second switching signal in response to the frame detect signal from the frame controller to control a switching operation of a track distributed switch, a buffer for dividing the input video data distributed by the track distribution switch in the unit of segment and storing the video data of the divided segments, a segment shifting counter for generating a third switching signal in response to the first switching signal from the frame controller, a shifting switching circuit for selectively transferring the video data from the buffer in response to the third switching signal from the segment shifting counter, a signal select switching circuit for selectively transferring the video data from the shifting switching circuit in response to the first switching signal from the frame controller, and a recording circuit for adding a synchronous signal and an identification signal to output video data from the signal select switching circuit and recording the resultant video data on the video tape.

3 Claims, 4 Drawing Sheets

SIX TIMES PLAY-BACK IN MULTI-SPEED

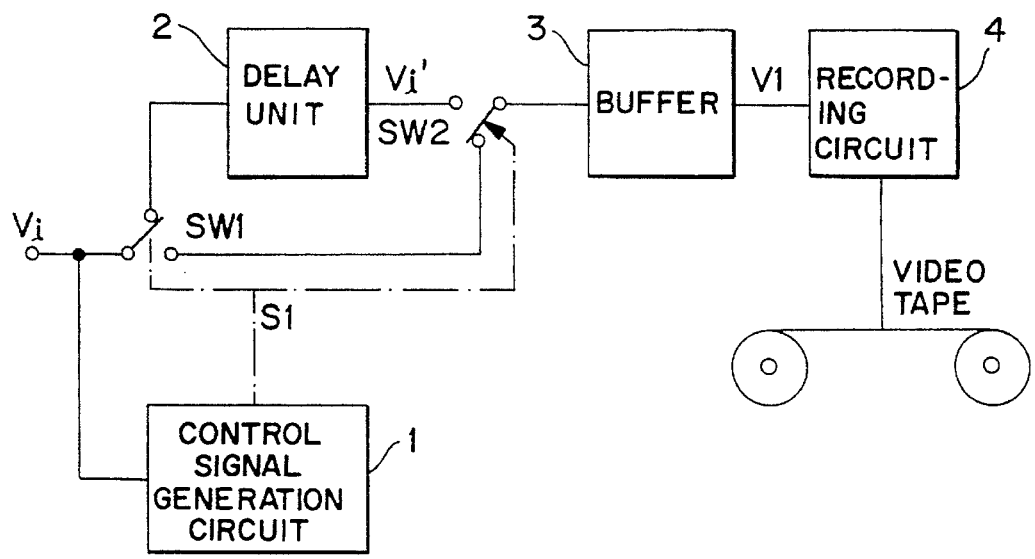

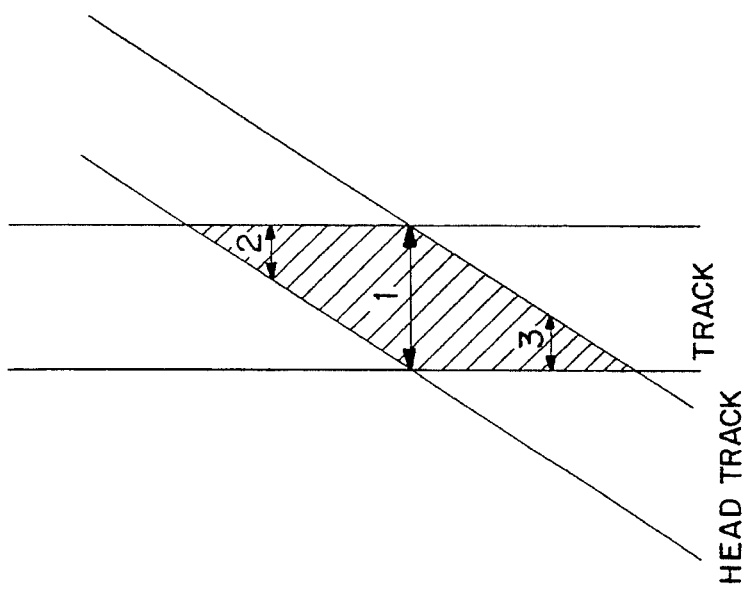

VIDEO DATA RECORDING APPARATUS FOR DIGITAL VIDEO CASSETTE RECORDER

BACKGROUND OF THE INVENTION

1. Field of the Invention

The present invention relates in general to digital video cassette recorders, and more particularly to a video data recording apparatus for a digital video cassette recorder for recording input video data in a shuffling manner to obtain a distinct picture quality.

2. Description of the Prior Art

Generally, in a digital recording format of a digital video cassette recorder (referred to hereinafter as VCR), an input video signal is pulse code-modulated (PCM) and pixel values thereof are then coded in the unit of a desired bit. Namely, the input video signal is converted into digital video data, which is then compressed by a variable length coding which varies a length of bit being coded every pixel. The digital video data compressed by the variable length coding is partitioned in the unit of a desired sync-block and then recorded on a video tape in a predetermined order.

In a change-speed playback mode which is one of special functions of the digital VCR, the video data recorded on the video tape is scanned by a head disposed in a spiral form, being divided into playback portions A and covered-up portions or no-playback portions B as shown in FIG. 1, which is a view illustrating a trace of the head for the playback of the video data recorded on the video tape. As a result, only the playback portions A are repeatedly scanned.

For the purpose of preventing a degradation in a picture quality due to the no-playback portions B, the playback portions A and the no-playback portions B are shuffled with each other and then recorded on the video tape. As a result, the shuffled video data are recorded and played back. The shuffling of the video data is an important factor of determining the recording format.

Referring to FIG. 2, there is shown a block diagram of a conventional video data recording apparatus for the digital VCR. As shown in this drawing, the conventional video data recording apparatus comprises a control signal generation circuit 1 for generating a vertical synchronous signal Vsyn, a write clock signal and a switching signal S1 in response to input video data V1 of one frame a delay unit 2 for delaying the input video data Vi by a predetermined time period, a buffer 3 for shuffling the input video data V1 and the delayed video data Vi' from the delay unit 2, and a recording circuit 4 for amplifying output video data V1 from the buffer 3 by a predetermined level, adding a synchronous signal SYN and an identification signal Id to the amplified video data and recording the resultant video data on the video tape.

A switch SW2 is adapted to selectively transfer one of the input video data Vi and the delayed video data Vi' from the delay unit 2 to the buffer 3.

A switch SW1 is adapted to selectively transfer the input video data Vi to the delay unit 2 and the switch SW2 in response to the switching signal from the control signal generation circuit 1.

The operation of the conventional video data recording apparatus with the above-mentioned construction will hereinafter be described with reference to FIGS. 2 and 3.

FIG. 3 is a view illustrating the shuffled video data in FIG. 2. A unit of a shuffling size of the video data on the video tape is a segment, which is the minimum codable unit with a predetermined size. The segments are shifted along tracks of the video tape. As shown in FIG. 3, the video data recorded on the video tape is shuffled so that the sync-blocks can repeatedly be detected from the video data.

In operation, upon receiving the input video data Vi the control signal generation circuit 1 generates the vertical synchronous signal Vsyn for the synchronization of the input video data Vi and the write clock signal for the recording of the input video data Vi. Also, the control signal generation circuit 1 generates the switching signal S1 for the control of the switches SW1 and SW2, In response to the switching signal S1 from the control signal generation circuit 1, the switches SW1 and SW2 perform the switching operations so that the input video data Vi can be transferred to the buffer 3.

Upon application of the input video data Vi of one-frame to the buffer 3 through the switches SW1 and SW2, the switches SW1 and SW2 perform the switching operations in response to the switching signal S1 from the control signal generation circuit 1 so that the input video data Vi can be transferred to the delay unit 2 and the delayed video data Vi' from the delay unit 2 can be transferred to the buffer 3.

The input video data Vi and the delayed video data Vi' from the delay unit 2 are shuffled by the buffer 3 as shown in FIG. 3.

Namely, the video data of one frame tape is divided in the unit of segment. The video-data of the divided segments are shuffled as shown in FIG. 3. For example, in the case where the video data is divided into four segments in each track and it is played back in a four times speed playback mode, the video data of the first segment (1,1) of the first track is repeatedly recorded on a position of the fourth segment (5,4) of the fifth track. Also, the video data of the second segment (1,2) of the first track is recorded on a position of the first segment (5,1) of the fifth track. In this manner, the shuffling is performed.

At this time, the optimum multi-speed is determined according to the size of the segment shuffled by the buffer 3 to obtain a distinct picture quality.

With the shuffling completed, the output video data from the buffer 3 is amplified by the predetermined level by the recording circuit 4. Then, the recording circuit 4 adds the synchronous signal SYN and the identification signal Id to the amplified video data and records the resultant video data on the video tape.

However, the above-mentioned conventional video data recording apparatus has a disadvantage in that the time and effect of the no-playback portions are different according to the multi-speeds tracing the tracks. Namely, the optimum multi-speed is determined according to the size of the shuffled segment and the time and effect of the no-playback portions in other multi-speeds are in proportion to a distance of the optimum multi-speed. This results in a degradation in the picture quality.

SUMMARY OF THE INVENTION

Therefore, the present invention has been made in view of the above problem, and it is an object of the present invention to provide a video data recording apparatus for a digital VCR in which a loss of video data is reduced in each track so that a distinct picture quality can be obtained.

In accordance with the present invention, the above and other objects can be accomplished by a provision of a video data recording apparatus for a digital VCR comprising frame control means for detecting a vertical synchronous signal from input video data and outputting a frame detect signal and a first witching signal in response to the detected vertical synchronous signal; switching counting means for generating a second switching signal in response to the frame detect signal from said frame control means to control a switching operation of a track distribution switch; buffering means for dividing the input video data distributed by said track distribution switch in the unit of segment and storing the video data of the divided segments; segment shifting counting means for generating a third switching signal in response to the first switching signal from said frame control means; shifting switching means for selectively transferring the video data from said buffering means in response to the third switching signal from said segment shifting counting means; signal select switching means for selectively transferring the video data from said shifting switching means in response to the first switching signal from said frame control means; and recording means for adding a synchronous signal and an identification signal to output video data from said signal select switching means and recording the resultant video data on the video tape.

BRIEF DESCRIPTION OF THE DRAWINGS

The above and other objects, features and advantages of the present invention will be more clearly understood from the following detailed description taken in conjunction with the accompanying drawings, in which:

FIG. 2 is a block diagram of a conventional video data recording apparatus for a digital VCR;

FIG. 3 is a view illustrating video data shuffled by the apparatus in FIG. 2;

FIG. 5 is a view illustrating video data shuffled by the apparatus in FIG. 4; and FIG. 6 is a view illustrating playback portions in a multi-speed mode in the general digital VCR.

DETAILED DESCRIPTION OF THE PREFERRED EMBODIMENT

Figure 1:
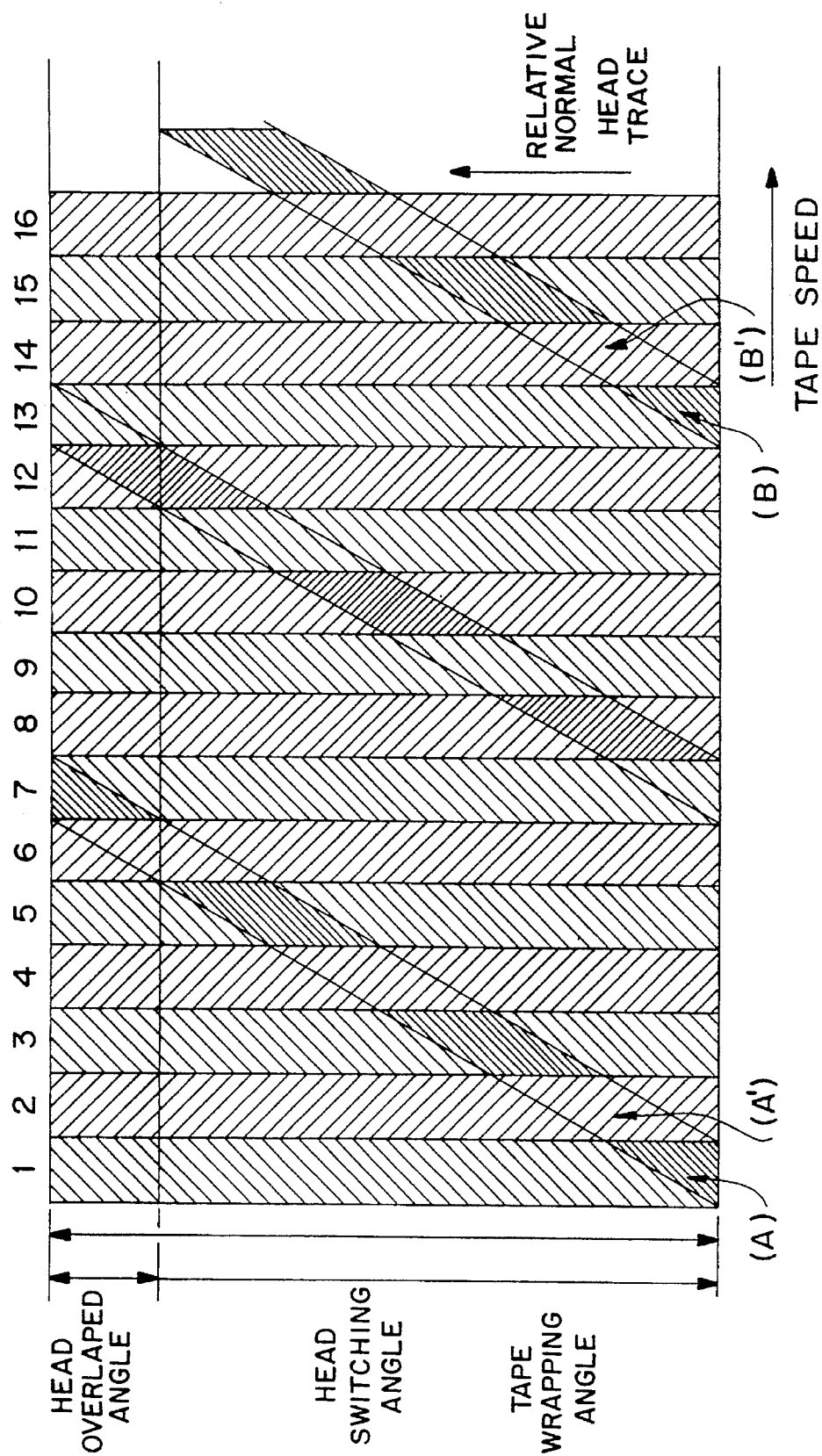
FIG. 1 is a view illustrating a trace of a head for the playback of video data recorded on a video tape in a general digital VCR.
Figure 4:
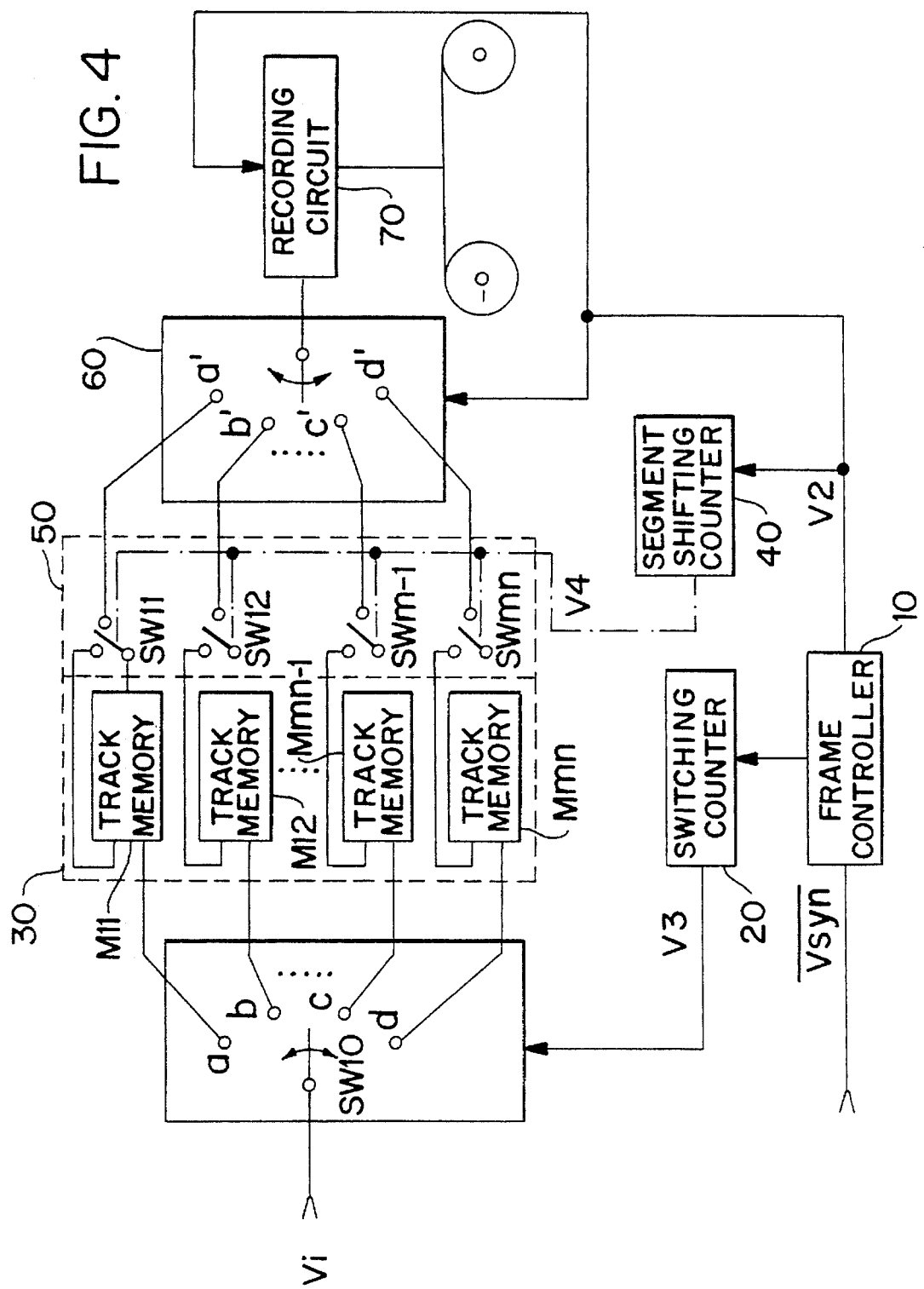
FIG. 4 is a block diagram of a video data recording apparatus for a digital VCR in accordance with the present invention.

Referring to FIG. 4, there is shown a block diagram of a video data recording apparatus for a digital VCR in accordance with the present invention. As shown in this drawing, the video data recording apparatus comprises a frame controller 10 for detecting a vertical synchronous signal Vsyn from input video data Vi and outputting a frame detect signal V1 and a first witching signal V2 in response to the detected vertical synchronous signal Vsyn, a switching counter 20 for generating a second switching signal V3 in response to the frame detect signal V1 from the frame controller 10 to control a switching operation of a track distribution switch SW10, and a buffer 30 for dividing the input video data Vi distributed by the track distribution switch SW10 in the unit of segment and storing the video data of the divided segments.

A segment shifting counter 40 is provided in the video data recording apparatus to generate a third switching signal V4 in response to the first switching signal V2 from the frame controller 10.

A shifting switching circuit 50 is also provided in the video data recording apparatus to selectively transfer the video data from the buffer 30 in response to the third switching signal V4 form the segment shifting counter 40.

Also, the video data recording apparatus comprises a signal select switching circuit 60 for selectively transferring the video data from the shifting switching circuit 50 in response to the first switching signal V2 from the frame controller 10, and a recording circuit 70 for adding a synchronous signal SYN and an identification signal Id to output video data from the signal select switching circuit 60 and recording the resultant video data on the video tape.

The buffer 30 includes a plurality of track memories M11–Mmn for dividing the input video data Vi distributed by the track distribution switch SW10 in the unit of segment and storing the video data of the divided segments, respectively.

The shifting switching circuit 50 includes a plurality of switches SW11–SWmn responsive to the third switching signal V4 from the segment shifting counter 40 for selectively transferring the video data from the track memories M11–Mmn in the buffer 30 to the signal select switching circuit 60 or feeding back them to the track memories M11–Mmn in the buffer 30, respectively.

The signal select switching circuit 60 is provided with a switch for selectively transferring the video data from the switches SW11–SWmn in the shifting switching circuit 50 to the recording circuit 70 in response to the first switching signal V2 from the frame controller 10.

The operation of the video data recording apparatus with the above-mentioned construction in accordance with the present invention will hereinafter be described in detail with reference to FIGS. 4 to 6.

In brief, an analog video signal is converted into digital video data and then, compression-coded. An error correction code is added to the compression-coded video data. Then, an interleaving process is performed to sequentially select the compression-coded Video data by a predetermined bit number. The sequentially selected video data are united and then channel-coded. The resultant video data is shuffled suitably to a recording format of the video tape.

In operation, the coded video data Vi is successively applied to the video data recording apparatus. Upon receiving the input video data Vi, the frame controller 10 detects the vertical synchronous signal Vsyn from the input video data Vi and outputs the frame detect signal V1 and the first switching signal V2 in response to the detected vertical synchronous signal Vsyn.

The frame detect signal V1 from the frame controller 10 is applied to the switching counter 20. In response to the frame detect signal V1 from the frame controller 10, the switching counter 20 outputs the second switching signal V3 to the track distribution switch SW10. The switching operation of the track distribution switch SW10 is performed according to the second switching signal V3 from the switching counter 20 so that the input video data Vi can be distributed to the buffer and then stored therein, being divided in the unit of segment. The video data of the divided segments are stored in the track memories M11–Mmn of the buffer 30, respectively.

The first switching signal V2 from the frame controller 10 is applied to the segment shifting counter 40, resulting in generation of the third switching signal V4 in the segment shifting counter 40. In response to the third switching signal V4 from the segment shifting counter 40, the switches SW11–SWmn of the shifting switching circuit 50 are selectively operated to transfer the video data from the corresponding track memories M11–Mmn of the buffer 30 to the signal select switching circuit 60. The signal select switching circuit 60 selectively transfers the video data from the switches SW11–SWmn of the shifting switching circuit 50 to the recording circuit 70 in response to the first switching signal V2 from the frame controller 10.

Generally, the video data recorded on the track of the video tape is different in size from that on the same track in a multi-speed playback mode since a track deviation is generated due to an azimuth of a head as shown in FIG. 6. In the case where the size of the video data is small as shown by the reference numerals 2 and 3 in FIG. 6, the probability that the video data is to be lost is high. In this case, according to the present invention, the switches SW11–SWmn of the shifting switching circuit 50 are operated in response to the third switching signal V4 from the segment shifting counter 40 so that the video data stored in the track memories M11–Mmn of the buffer 30 can be shuffled as shown in FIG. 5.

The recording circuit 70 adds the synchronous signal SYN and the identification signal Id to the shuffled video data from the signal select switching circuit 60 and records the resultant video data on the travelling video tape.

As apparent from the above description, according to the present invention, the no-playback portions of the video data can be played back in the multi-speed playback mode regardless of the multi-speeds, with a large capacity of buffer used. Also, the video data is shuffled in the track with the playback portions, resulting in the prevention of the loss of the video data due to the difference in size. These have the effect of obtaining a high picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video data recording apparatus for a digital VCR comprising:

frame control means for detecting a vertical synchronous signal from input video data and outputting a frame detect signal and a first switching signal in response to the detected vertical synchronous signal;

switching counting means for generating a second switching signal in response to the frame detect signal from said frame control means to control a switching operation of a track distribution switch;

buffering means for dividing the input video data distributed by said tack distribution switch in the unit of segment and storing the video data of the divided segments;

segment shifting counting means for generating a third switching signal in response to the first switching signal from said frame control means;

shifting switching means for selectively transferring the video data from said buffering means in response to the third switching signal from said segment shifting counting means;

signal select switching means for selectively transferring the video data from said shifting switching means in response to the first switching signal from said frame control means; and recording means for adding a synchronous signal and an identification signal to output video data from said signal select switching means and recording the resultant video data on the video tape.

2. A video data recording apparatus for a digital VCR as set forth in claim 1, wherein said buffering means includes:

a plurality of track memories for dividing the input video data distributed by said track distribution switch in the unit of segment and storing the video data of the divided segments, respectively.

3. A video data recording apparatus for a digital VCR as set forth in claim 1, wherein said shifting switching means includes:

a plurality of switches responsive to the third switching signal from said segment shifting means for selectively transferring the video data from said buffering means to said signal select switching means or feeding back them to said buffering means, respectively.

\* \* \* \* \*